United States Patent
Shin et al.

(10) Patent No.: US 11,436,815 B2
(45) Date of Patent: Sep. 6, 2022

(54) METHOD FOR LIMITING OBJECT DETECTION AREA IN A MOBILE SYSTEM EQUIPPED WITH A ROTATION SENSOR OR A POSITION SENSOR WITH AN IMAGE SENSOR, AND APPARATUS FOR PERFORMING THE SAME

(71) Applicant: RESEARCH & BUSINESS FOUNDATION SUNGKYUNKWAN UNIVERSITY, Suwon-si (KR)

(72) Inventors: Dong Kun Shin, Seoul (KR); Geun Hye Jo, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 2 days.

(21) Appl. No.: 17/108,000

(22) Filed: Dec. 1, 2020

(65) Prior Publication Data

US 2021/0174113 A1 Jun. 10, 2021

(30) Foreign Application Priority Data

Dec. 10, 2019 (KR) .................. 10-2019-0163965

(51) Int. Cl.
  *G06T 7/20* (2017.01)
  *G06V 10/22* (2022.01)
  *G06V 20/56* (2022.01)

(52) U.S. Cl.
  CPC ............ *G06V 10/22* (2022.01); *G06T 7/20* (2013.01); *G06V 20/56* (2022.01); *G06T 2207/30252* (2013.01)

(58) Field of Classification Search
  CPC ........ G06V 10/25; G06V 10/22; G06V 20/58; G06V 20/56; G06T 7/20
  See application file for complete search history.

(56) References Cited

U.S. PATENT DOCUMENTS

2002/0070277 A1* 6/2002 Hannigan ............ G06F 3/0317
  235/462.45
2016/0165246 A1* 6/2016 Nagumo ................ H04N 19/70
  375/240.25

(Continued)

FOREIGN PATENT DOCUMENTS

KR 10-2013-0057699 A 6/2013
KR 10-2017-0039465 A 4/2017

OTHER PUBLICATIONS

Korean Office Action dated Nov. 18, 2020 in counterpart Korean Patent Application No. 10-2019-0163965 (5 pages in Korean).

*Primary Examiner* — Sam Bhattacharya
(74) *Attorney, Agent, or Firm* — NSIP Law

(57) ABSTRACT

Provided are a method for limiting an object detection area in a mobile system equipped with an image sensor and an apparatus for performing the method. The method comprises receiving an image obtained with respect to a detection target object from the image sensor and receiving sensor information from a rotation detection sensor only when the mobile system is equipped with the rotation detection sensor—the sensor information includes at least one of 3-axis angular velocity and steering information, wherein the steering information includes a steering angle and a speed; determining rotation of the mobile system by using at least one of the sensor information and motion vectors; and if it is determined that the mobile system is rotating, limiting an object detection area by using at least one of the sensor information and the motion vectors.

18 Claims, 11 Drawing Sheets

(56) References Cited

U.S. PATENT DOCUMENTS

| | | | |
|---|---|---|---|
| 2017/0080952 A1* | 3/2017 | Gupta | G08G 1/163 |
| 2017/0308989 A1* | 10/2017 | Lee | G06T 1/20 |
| 2018/0158323 A1* | 6/2018 | Takenaka | G06V 20/46 |
| 2021/0003049 A1* | 1/2021 | Lee | F01M 1/20 |
| 2021/0232871 A1* | 7/2021 | Iancu | G06V 20/58 |

* cited by examiner

METHOD FOR LIMITING OBJECT DETECTION AREA IN A MOBILE SYSTEM EQUIPPED WITH A ROTATION SENSOR OR A POSITION SENSOR WITH AN IMAGE SENSOR, AND APPARATUS FOR PERFORMING THE SAME

CROSS-REFERENCE TO RELATED APPLICATIONS

This application claims priority to Korean Patent Application No. 10-2019-0163965 filed on 10 Dec. 2019 in Korea, the entire contents of which are hereby incorporated by reference in their entirety.

BACKGROUND OF THE DISCLOSURE

Field of the Disclosure

The present disclosure relates to object detection and, more particularly, to a method and an apparatus for limiting an object detection area.

Related Art

Object detection is a technology used in many application areas such as intelligent monitoring and surveillance system or autonomous navigation and refers to a computer vision task that detects positions and types of various objects in an image. In general, object detection converts an image into a feature map, generates a lot of candidate areas that may have an object in the corresponding image, and performs image classification and actual area prediction by using feature map information corresponding to each candidate area.

Conventional object detection methods have a problem that the whole image is searched for existence of objects irrespective of their possibility of being present in the respective areas and thereby unnecessary computations are introduced and the time required for object detection is increased.

Also, since images recorded by a camera are now commonly expressed with a high resolution of 640×480 pixels or more, as the resolution of an input image becomes higher, a more amount of computations are required for performing object detection, which makes it difficult to perform object detection in real-time in a mobile environment characterized by low computational performance.

REFERENCES

Patents (Patent 1) Korean Patent Application Publication No. 10-2017-0039465 (System and Method for Collecting Traffic Information Using Real-time Object Detection, Pusan National University, Apr. 11, 2017)

SUMMARY OF THE DISCLOSURE

To solve the problem above, an object of the present disclosure is to provide a method for limiting an object detection area in a mobile system equipped with an image sensor so that the time required for object detection may be reduced and thereby object detection may be performed even in the mobile environment.

To solve the problem above, another object of the present disclosure is to provide an apparatus for limiting an object detection area in a mobile system equipped with an image sensor so that the time required for object detection may be reduced and thereby object detection may be performed even in the mobile environment.

However, it should be noted that technical objects to be achieved by the present disclosure are not limited to those described above but may be extended in various ways without departing from the technical principles and scope of the present disclosure.

To solve the problem above, a method for limiting an object detection area in a mobile system equipped with an image sensor according to one embodiment of the present disclosure comprises receiving an image obtained with respect to a detection target object from the image sensor and receiving sensor information from a rotation detection sensor only when the mobile system is equipped with the rotation detection sensor—the sensor information includes at least one of 3-axis angular velocity and steering information, wherein the steering information includes a steering angle and a speed; determining rotation of the mobile system by using at least one of the sensor information and motion vectors; and if it is determined that the mobile system is rotating, limiting an object detection area by using at least one of the sensor information and the motion vectors.

According to one aspect, the rotation detection sensor may include at least one of gyroscope and On Board Diagnostics (OBD). According to one aspect, the determining rotation of the mobile system may determine the rotation according to whether magnitude of one of the 3-axis angular velocities is equal to or larger than a predetermined reference value.

According to one aspect, the determining rotation of the mobile system may determine the rotation according to whether the steering angle and the speed are equal to or larger than the respective predetermined reference values.

According to one aspect, the motion vectors may be calculated by using position changes of one or more objects within a sampled area of the image, and the determining rotation of the mobile system may determine the rotation according to whether magnitude of an average of the motion vectors is equal to or larger than a predetermined reference value.

According to one aspect, the limiting an object detection area may limit the object detection area to an area corresponding to a rotation direction of the mobile system within the image.

According to one aspect, the receiving sensor information may further receive position information from GPS.

According to one aspect, the limiting an object detection area may limit an object detection area according to road conditions around a current location obtained from a database in which road information is recorded.

According to one aspect, the limiting an object detection area may limit the object detection area to a third area combining a first area limited by using at least one of the sensor information and the motion vectors and a second area limited according to road conditions around a current location obtained from the database in which road information is recorded.

According to one aspect, the determining rotation of the mobile system may determine rotation of the mobile system by using the motion vectors when the mobile system is not equipped with the rotation detection sensor, determine rotation of the mobile system by using the 3-axis angular velocity when the sensor information is the 3-axis angular velocity, determine rotation of the mobile system by using the steering information when the sensor information is the steering information, and determine rotation of the mobile system when the sensor information includes both of the 3-axis angular velocity and the steering information.

To solve the problem, an apparatus for limiting an object detection area in a mobile system equipped with an image sensor according to another embodiment of the present disclosure may comprise a sensor information receiving unit receiving an image obtained with respect to a detection target object from the image sensor and receiving sensor information from a rotation detection sensor only when the mobile system is equipped with the rotation detection sensor—the sensor information includes at least one of 3-axis angular velocity and steering information, wherein the steering information includes a steering angle and a speed; a rotation determining unit determining rotation of the mobile system by using at least one of the sensor information and motion vectors; and an object detection area limiting unit limiting an object detection area by using at least one of the sensor information and the motion vectors if it is determined that the mobile system is rotating.

According to one aspect, the rotation detection sensor may include at least one of gyroscope and On Board Diagnostics (OBD). According to one aspect, the rotation determining unit may determine the rotation according to whether magnitude of one of the 3-axis angular velocities is equal to or larger than a predetermined reference value.

According to one aspect, the rotation determining unit may determine the rotation according to whether the steering angle and the speed are equal to or larger than the respective predetermined reference values.

According to one aspect, the motion vectors may be calculated by using position changes of one or more objects within a sampled area of the image, and the rotation determining unit may determine the rotation according to whether the average of the motion vectors is equal to or larger than a predetermined reference value.

According to one aspect, the object detection area limiting unit may limit the object detection area to an area corresponding to a rotation direction of the mobile system within the image.

According to one aspect, the sensor information receiving unit may further receive position information from GPS.

According to one aspect, the object detection area limiting unit may limit an object detection area according to road conditions around a current location obtained from a database in which road information is recorded.

According to one aspect, the object detection area limiting unit may limit the object detection area to a third area combining a first area limited by using at least one of the sensor information and the motion vectors and a second area limited according to road conditions around a current location from the database in which road information is recorded.

According to one aspect, the rotation determining unit may determine rotation of the mobile system by using the motion vectors when the mobile system is not equipped with the rotation detection sensor, determine rotation of the mobile system by using the 3-axis angular velocity when the sensor information is the 3-axis angular velocity, determine rotation of the mobile system by using the steering information when the sensor information is the steering information, and determine rotation of the mobile system when the sensor information includes both of the 3-axis angular velocity and the steering information.

To solve the problem above, in a computer-readable recording medium storing a computer program including commands by which a computer commands a mobile system equipped with an image sensor to limit an object detection area according to yet another embodiment of the present disclosure, the computer program includes commands by which the computer commands: to receive an image obtained with respect to a detection target object from the image sensor and receive sensor information from a rotation detection sensor only when the mobile system is equipped with the rotation detection sensor—the sensor information includes at least one of 3-axis angular velocity and steering information, wherein the steering information includes a steering angle and a speed; to determine rotation of the mobile system by using at least one of the sensor information and motion vectors; and to limit an object detection area by using at least one of the sensor information and the motion vectors if it is determined that the mobile system is rotating.

DESCRIPTION OF EXEMPLARY EMBODIMENTS

Since the present disclosure may be modified in various ways and may provide various embodiments, specific embodiments will be depicted in the appended drawings and described in detail with reference to the drawings.

However, it should be understood that the specific embodiments are not intended to limit the gist of the present disclosure to the specific embodiments; rather, it should be understood that the specific embodiments include all of the modifications, equivalents or substitutes described by the technical principles and belonging to the technical scope of the present disclosure.

The terms such as first and second are introduced to describe various elements, but the elements should not be limited by the terms. The terms are used only for the purpose of distinguishing one from the other elements. For example, a first element may be called a second element without leaving the technical scope of the present disclosure, and similarly, the second element may be called the first element.

If an element is said to be "connected" or "attached" to other element, the former may be connected or attached directly to the other element, but there may be a case in which another element is present between the two elements. On the other hand, if an element is said to be "directly connected" or "directly attached" to other element, it should be understood that there is no other element between the two elements.

Terms used in this document are intended only for describing a specific embodiment and are not intended to limit the technical scope of the present disclosure. A singular expression should be understood to indicate a plural expression unless otherwise explicitly stated. The term of "include" or "have" is used to indicate existence of an embodied feature, number, step, operation, element, component, or a combination thereof; and should not be understood to preclude the existence or possibility of adding one or more other features, numbers, steps, operations, elements, components, or a combination thereof.

Unless defined otherwise, all of the terms used in this document, including technical or scientific terms, provide the same meaning as understood generally by those skilled in the art to which the present disclosure belongs. Those terms defined in ordinary dictionaries should be interpreted to have the same meaning as conveyed by a related technology in the context. And unless otherwise defined explicitly in the present disclosure, those terms should not be interpreted to have ideal or excessively formal meaning.

In what follows, preferred embodiments of the present disclosure will be described clearly and in detail with reference to appended drawings so that those skilled in the art to which the present disclosure belongs may implement the present disclosure easily.

Figure 1:
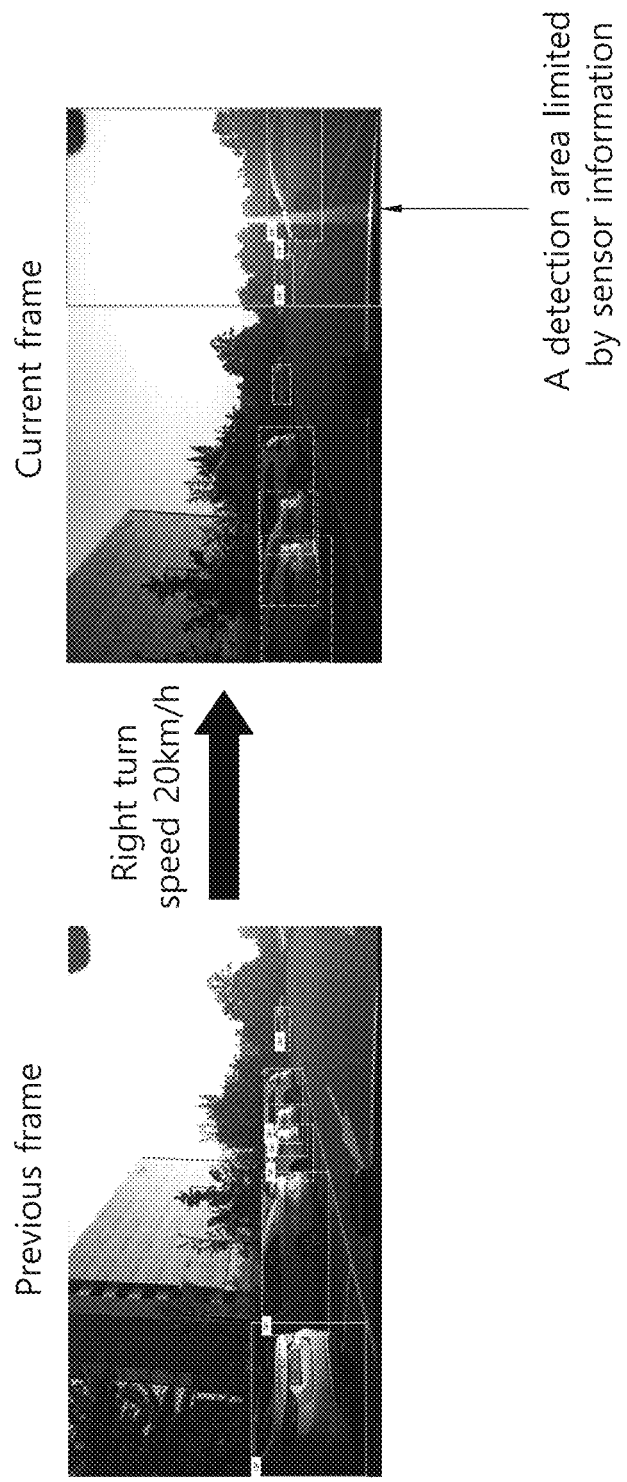
FIG. 1 illustrates a concept of limiting an object detection area.

FIG. 1 illustrates a concept of limiting an object detection area.

Object detection is a technology used in many application areas such as intelligent monitoring and surveillance system or autonomous navigation and refers to a computer vision task that detects positions and types of various objects in an image. In general, object detection converts an image into a feature map, generates a lot of candidate areas that may have an object in the corresponding image, and performs image classification and actual area prediction by using feature map information corresponding to each candidate area.

Conventional object detection methods have a problem that the whole image is searched for existence of objects irrespective of their possibility of being present in the respective areas and thereby unnecessary computations are introduced and the time required for object detection is increased.

Also, since images recorded by a camera are now commonly expressed with a high resolution of 640×480 pixels or more, as the resolution of an input image becomes higher, a more amount of computations are required for performing object detection, which makes it difficult to perform object detection in real-time in the mobile environment characterized by low computational performance.

Limiting an object detection area is proposed to solve the problem described above, which limits an area for object detection by using sensor information such as rotation information and/or position information of a system equipped with an image sensor so that object detection is performed only on an image area where a new object is expected to appear.

Referring to FIG. 1, when a vehicle makes a right turn, since it is very unlikely that a new object appears in the left side of the image but it is likely that a new object appears in the right side of the image, object detection may be limited to be performed only on the right side of the image instead of being performed over the whole image. For example, when objects such as other vehicles, pedestrians, or obstacles are to be detected in an image obtained from an image sensor installed at the front of the vehicle for the operation of Advanced Driver Assistance System (ADAS) such as Autonomous Emergency Braking (AEB), Line Keep Assist (LKA), and Smart Cruise Control (SCC); and the vehicle makes a right turn, since a new object may appear in the right side of the image, the object detection area may be limited so that object detection is performed only on the right side of the image.

As described above, by limiting the object detection area, the time required for detecting objects newly appearing in an image may be reduced, the effect of which becomes larger for systems with low computational performance.

Figure 2:
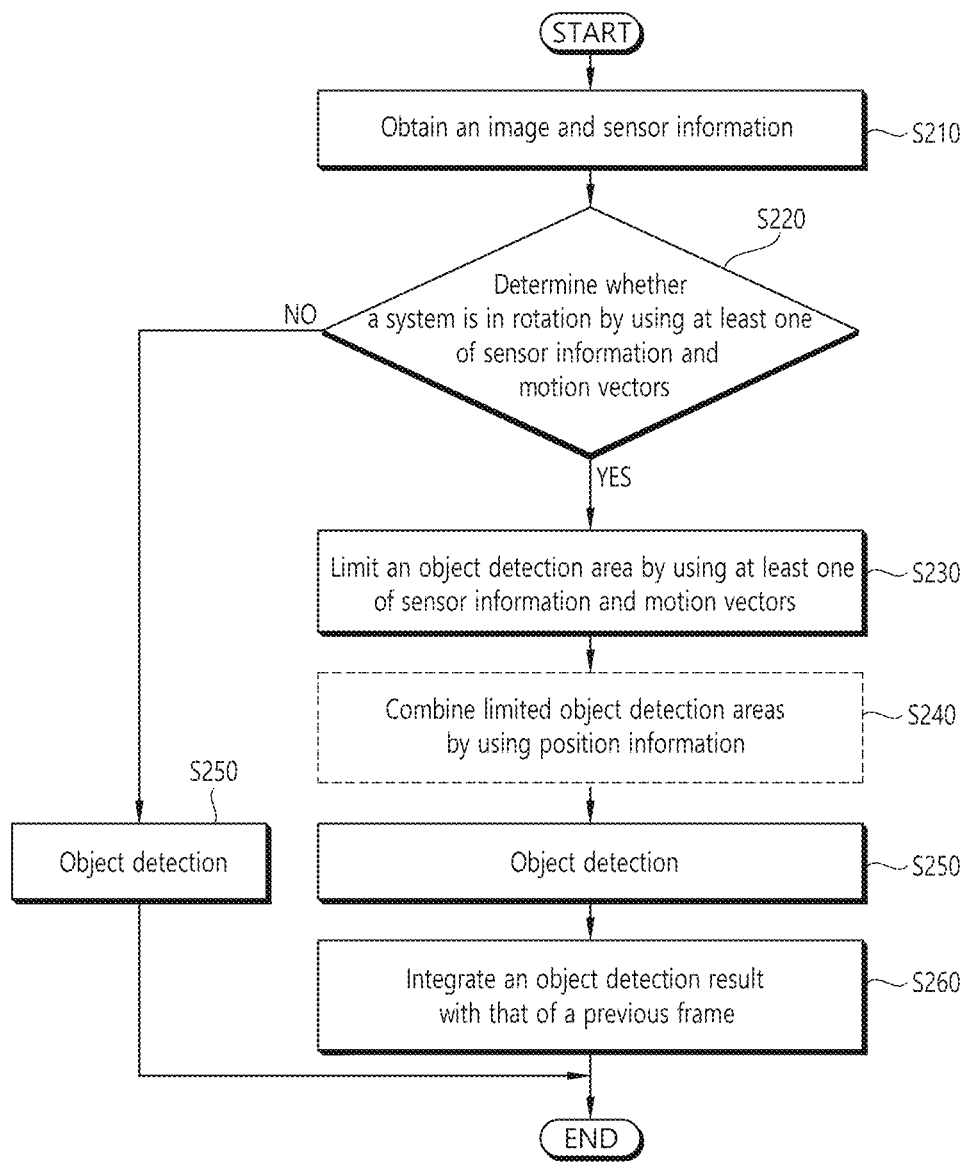
FIG. 2 is a flow diagram of the overall object detection process according to application of a method for limiting an object detection area in a mobile system equipped with an image sensor according to one embodiment of the present disclosure.

FIG. 2 is a flow diagram of the overall object detection process according to application of a method for limiting an object detection area in a mobile system equipped with an image sensor according to one embodiment of the present disclosure.

A method for limiting an object detection area in a mobile system equipped with an image sensor according to one embodiment of the present disclosure limits the object detection area to a part of an image based on sensor information. First, an image obtained with respect to a detection target object is received from the image sensor, and sensor information is received from a rotation detection sensor S210. Here, the rotation detection sensor includes at least one of gyroscope and On Board Diagnostics (OBD); the sensor information includes at least one of 3-axis angular velocity and steering information; and the steering information includes a steering angle and a speed. Meanwhile, position information may be further received from GPS in addition to the sensor information.

However, as will be described later, a method for limiting an object detection area in a mobile system equipped with an image sensor according to one embodiment of the present disclosure may limit the object detection area by using only the image received from the image sensor or limit the object detection area by using all of the image received from the image sensor, the sensor information received from the rotation detection sensor, and the position information received from GPS.

Next, rotation of the mobile system is determined by using at least one of sensor information and motion vectors S220. When the mobile system rotates, the object detection area is limited by using at least one of the sensor information and the motion vectors, and in the presence of position information, after the position information is integrated into the limited object detection area, object detection is performed only on the limited object detection area, and an object detection result is merged with the object detection result from a previous frame performed on the image area excluding the limited object detection area S230 to S260. When the mobile system is not rotating, the object detection area is not limited, and object detection is performed over the whole image S250. A method for determining rotation of a mobile system and limiting an object detection area according to the determination will be described later with reference to FIGS. 3 to 7.

Figure 3:
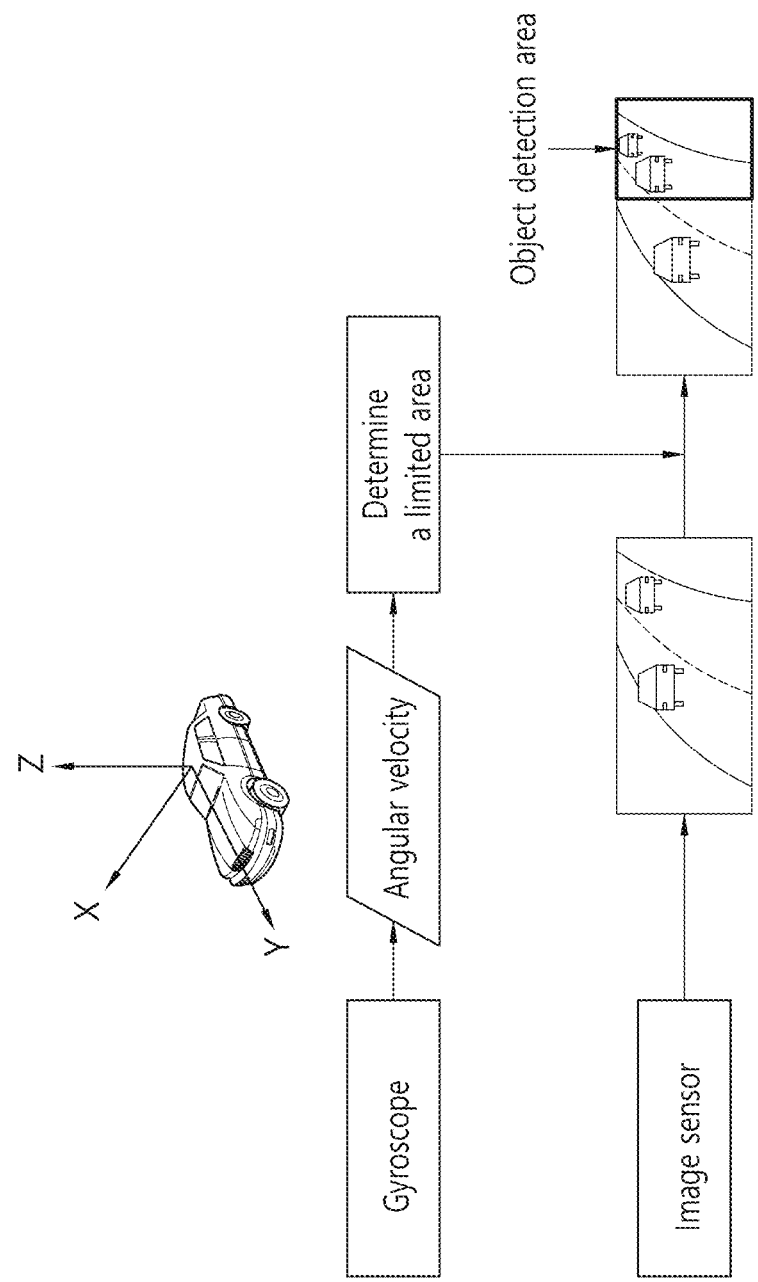
FIG. 3 illustrates a method for determining rotation of a mobile system by using a 3-axis angular velocity and limiting an object detection area in a method for limiting an object detection area in a mobile system equipped with an image sensor according to one embodiment of the present disclosure.

FIG. 3 illustrates a method for determining rotation of a mobile system by using a 3-axis angular velocity and limiting an object detection area in a method for limiting an object detection area in a mobile system equipped with an image sensor according to one embodiment of the present disclosure.

Referring to FIG. 3, rotation of a mobile system may be determined according to whether magnitude of one of the 3-axis angular velocities is equal to or larger than a first predetermined reference value. For example, as shown in FIG. 3, suppose the axes running from the left to the right, from the rear to the front, and from the bottom to the top of the mobile system are denoted by x, y, and z axis, respectively. If the largest of the angular velocities along the x, y, and z axis is equal to or larger than a first predetermined reference value, it may be determined that the mobile system is rotating around the corresponding axis. To be specific, if the magnitude of the angular velocity along the x-axis is equal to or larger than the first predetermined reference value, it may be determined that the mobile system is in rotation around the x-axis while, if the magnitude of the angular velocity along the z-axis is equal to or larger than the first predetermined reference value, it may be determined that the mobile system is in rotation around the z-axis.

The rotation direction of the mobile system may be determined by using the sign of the angular velocity. For example, if the angular velocity along the x-axis is positive, it may be determined that the mobile system rotates in the upward direction (for example, the mobile system enters an uphill road from the level ground) while, if the angular velocity along the x-axis is negative, it may be determined that the mobile system rotates in the downward direction (for example, the mobile system enters a downhill road from the level ground). On the other hand, if the angular velocity along the z-axis is positive, it may be determined that the mobile system rotates in the counterclockwise direction while, if the angular velocity along the z-axis is negative, it may be determined that the mobile system rotates in the clockwise direction.

At this time, the object detection area is limited to an area corresponding to the rotation direction of the mobile system within an image received from the image sensor. For example, if the angular velocity along the x-axis is positive, the object detection area may be limited to an upper area of the image; if the angular velocity along the x-axis is negative, the object detection area may be limited to a lower area of the image; if the angular velocity along the z-axis is positive, the object detection area may be limited to a left area of the image; and if the angular velocity along the z-axis is negative, the object detection area may be limited to a right area of the image.

Figure 4:
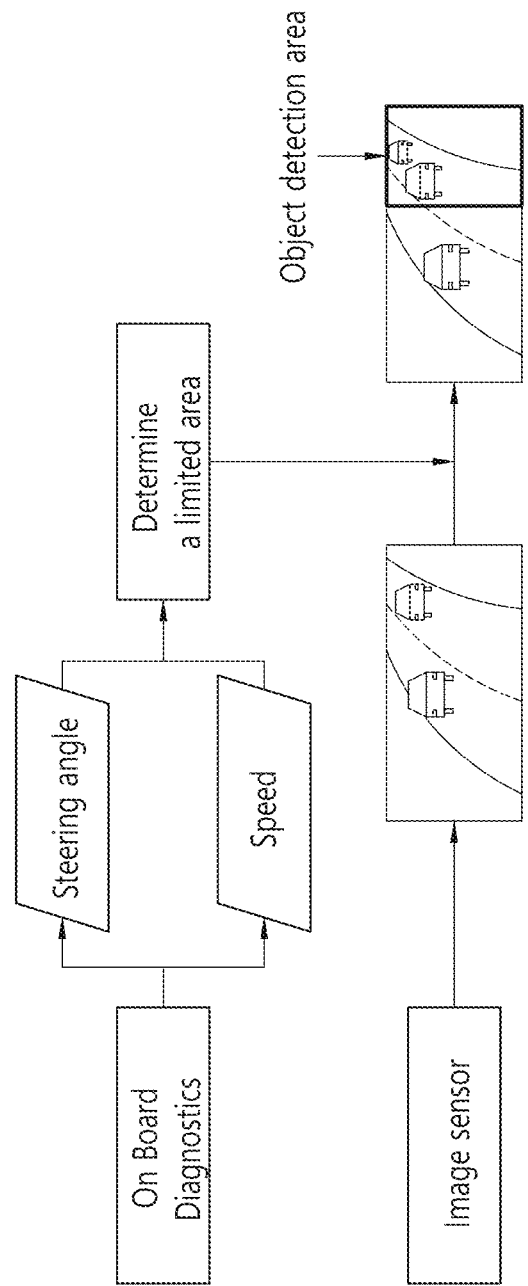
FIG. 4 illustrates a method for determining rotation of a mobile system by using steering information and limiting an object detection area in a method for limiting an object detection area in a mobile system equipped with an image sensor according to one embodiment of the present disclosure.

FIG. 4 illustrates a method for determining rotation of a mobile system by using steering information and limiting an object detection area in a method for limiting an object detection area in a mobile system equipped with an image sensor according to one embodiment of the present disclosure.

Referring to FIG. 4, rotation of a mobile system may be determined according to whether a steering angle and a speed are equal to or larger than a second and third predetermined reference values, respectively. At this time, it may be determined that the mobile system is rotating in the same direction as the steering angle, and the object detection area is limited to an area corresponding to the rotation direction of the mobile system within an image received from the image sensor.

Figure 5:
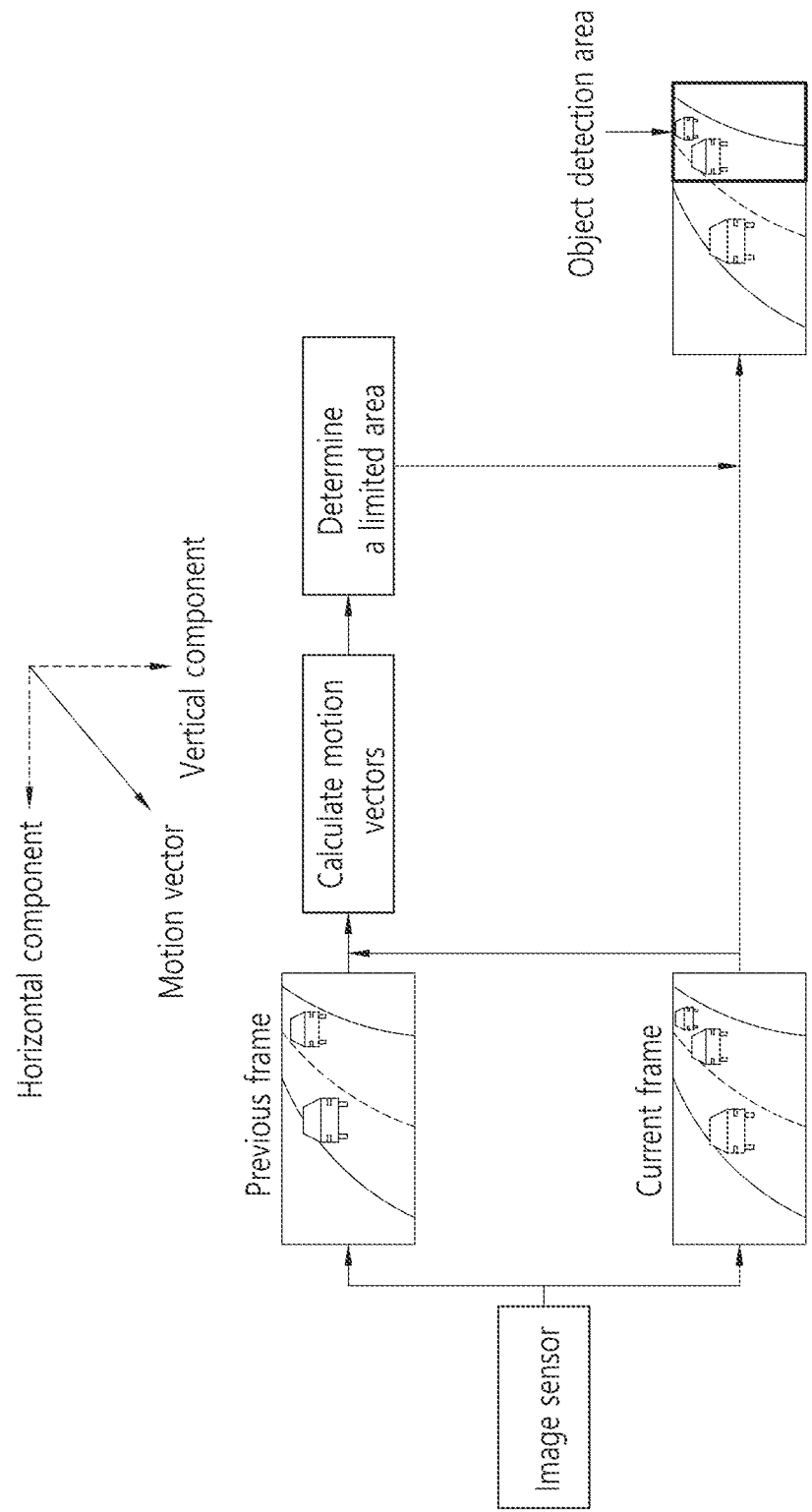
FIG. 5 illustrates a method for determining rotation of a mobile system by using motion vectors and limiting an object detection area in a method for limiting an object detection area in a mobile system equipped with an image sensor according to one embodiment of the present disclosure.

FIG. 5 illustrates a method for determining rotation of a mobile system by using motion vectors and limiting an object detection area in a method for limiting an object detection area in a mobile system equipped with an image sensor according to one embodiment of the present disclosure.

Motion vectors may be calculated by using a position change of a particular object between a previous frame image and a current frame image received from the image sensor. To be specific, a part of an image may be sampled, and motion vectors of objects within the corresponding area between a current frame image and a previous frame image may be calculated. At this time, rotation of the mobile system may be determined by whether the average of the calculated motion vectors is equal to or larger than a fourth predetermined value.

The rotation direction of the mobile system may be determined by comparing each component of the average of motion vectors. To be specific, the rotation direction of the mobile system is the opposite of the larger of the horizontal and vertical components of the average of motion vectors. For example, if the mobile system rotates to the right, objects within a previous frame image moves in an upper left direction or in a lower left direction in a current frame image. As shown in FIG. 5, when objects move in a lower left direction, the average of motion vectors points to the lower left direction. At this time, since the horizontal component of the average of motion vectors is larger than the vertical component, it may be determined that the mobile system rotates to the right.

At this time, an object detection area is limited to an area corresponding to the rotation direction of the mobile system within an image received from the image sensor. For example, as shown in FIG. 5, when the mobile system rotates to the right, namely, when the horizontal component of the average of motion vectors is larger than the vertical component, and the horizontal direction points to the left, the object detection area may be limited to an area in the right side of the image.

Figure 6:
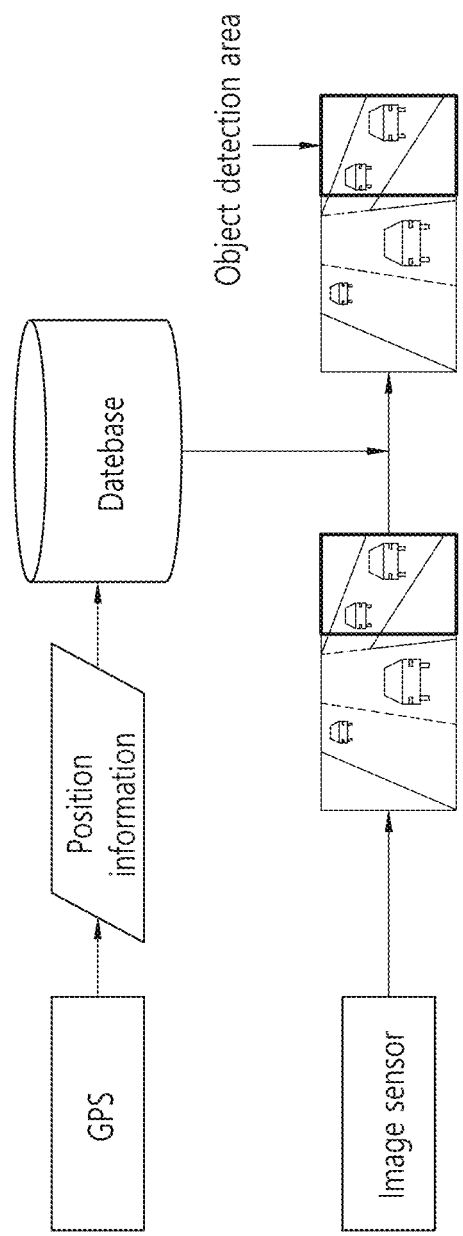
FIG. 6 illustrates a method for limiting an object detection area by using position information in a method for limiting an object detection area in a mobile system equipped with an image sensor according to one embodiment of the present disclosure.

FIG. 6 illustrates a method for limiting an object detection area by using position information in a method for limiting an object detection area in a mobile system equipped with an image sensor according to one embodiment of the present disclosure.

Limiting an object detection area by using position information may be used to deal with a special situation on the road when the mobile system is a vehicle. To be specific, a current position may be known from position information, and road conditions around a current position may be known from a database in which road information is recorded.

For example, as shown in FIG. 6, when a lane merges from the right side of the road ahead of the current position, the object detection area may be limited to an area in the right side of an image received from the image sensor.

An object detection area limited by using position information may be integrated with an object detection area limited by using another sensor information described above. Due to the integration of the object detection areas, new objects appearing from the rotation direction of the mobile system and new objects appearing due to road conditions around a current location may all be detected.

Figure 7:
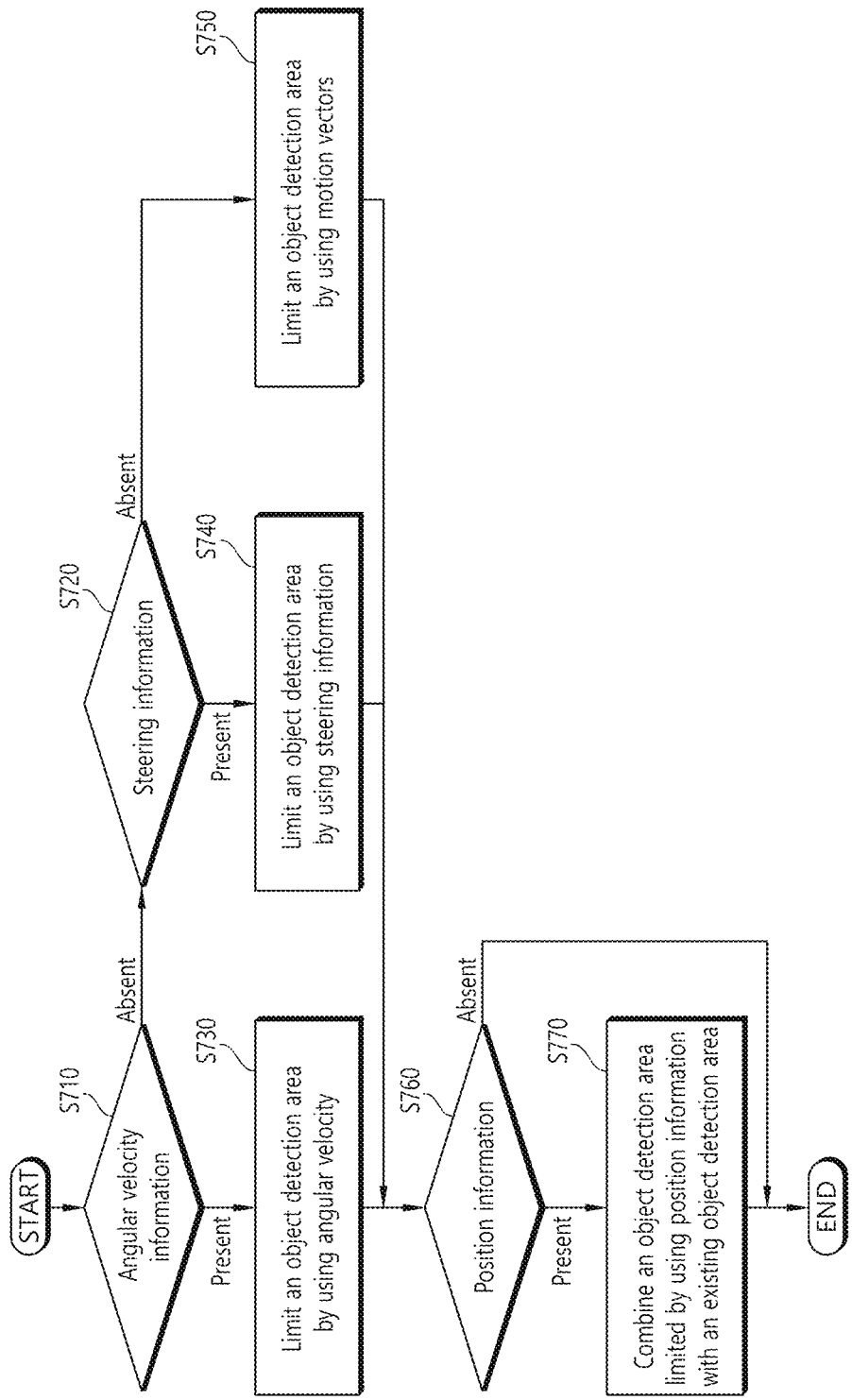
FIG. 7 is a flow diagram of a method for limiting an object detection area according to priority of sensor information in a method for limiting an object detection area in a mobile system equipped with an image sensor according to one embodiment of the present disclosure.

FIG. 7 is a flow diagram of a method for limiting an object detection area according to priority of sensor information in a method for limiting an object detection area in a mobile system equipped with an image sensor according to one embodiment of the present disclosure.

At least one of the 3-axis angular velocity, the steering information, and the motion vectors suffices to limit the object detection area within an image by using the corresponding sensor information as described above. However, in the presence of the three types of sensor information, the object detection area may be limited by using all of the sensor information, or the object detection area may be limited by using sensor information with a higher priority.

Since the 3-axis angular velocity is received directly from gyroscope, the 3-axis angular velocity provides the highest reliability. On the other hand, since motion vectors require dedicated calculations and objects within an image area for calculating the motion vectors may exhibit different movements from each other, the motion vectors provide lower reliability than the other two types of sensor information. Therefore, a method for limiting an object detection area in a mobile system equipped with an image sensor according to one embodiment of the present disclosure may assign priorities in order of 3-axis angular velocity, steering information, and motion vector; and an object detection area may be selected according to the sensor information with a higher priority.

However, since an object detection area limited by using position information varies depending on a current position of the mobile system and surrounding road conditions, the object detection area may be used together with the object detection area limited by using the 3-axis angular velocity, steering information, and motion vector.

Therefore, referring to FIG. 7, if received sensor information includes 3-axis angular velocity, an object detection area may be limited by using the 3-axis angular velocity S710, S730; and if received sensor information does not include 3-axis angular velocity but includes steering information, an object detection area may be limited by using the steering information S710, S720, S740. If received sensor information does not include 3-axis angular velocity nor steering information, an object detection area is limited by using motion vectors S710, S720, S750.

Afterwards, if received sensor information includes position information, an object detection area is limited by using the position information, and the object detection area may be combined with an object detection area limited by using the 3-axis angular velocity, steering information, or motion vector, after which object detection may be performed on the combined area. On the other hand, if received sensor information does not include position information, object detection may be performed only on the object detection area limited by using the 3-axis angular velocity, steering information, or motion vector S760, S770.

Figure 8A:
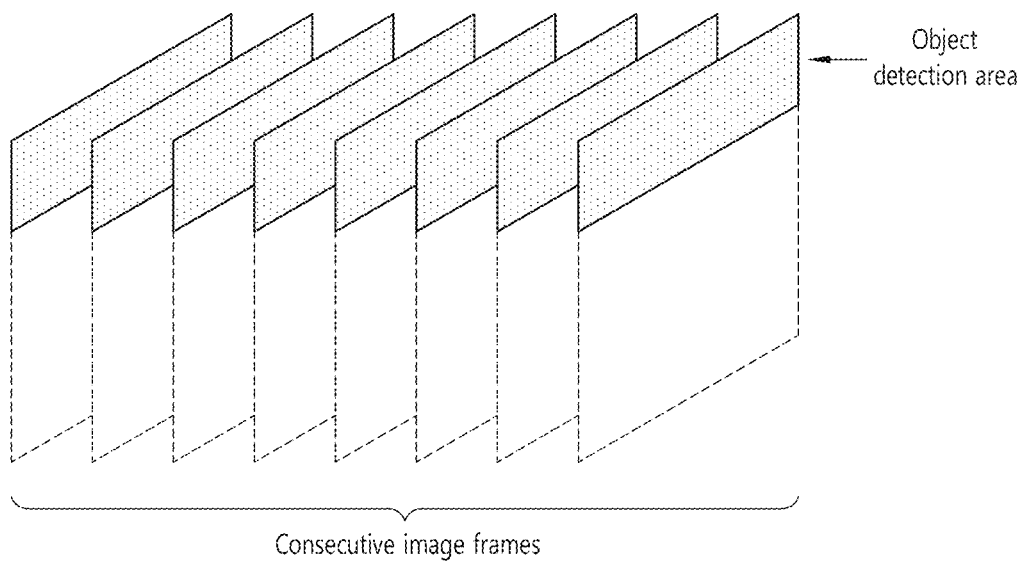
FIGS. 8A to 8C illustrate an application example of a method for limiting an object detection area in a mobile system according to one embodiment of the present disclosure.
Figure 8B:
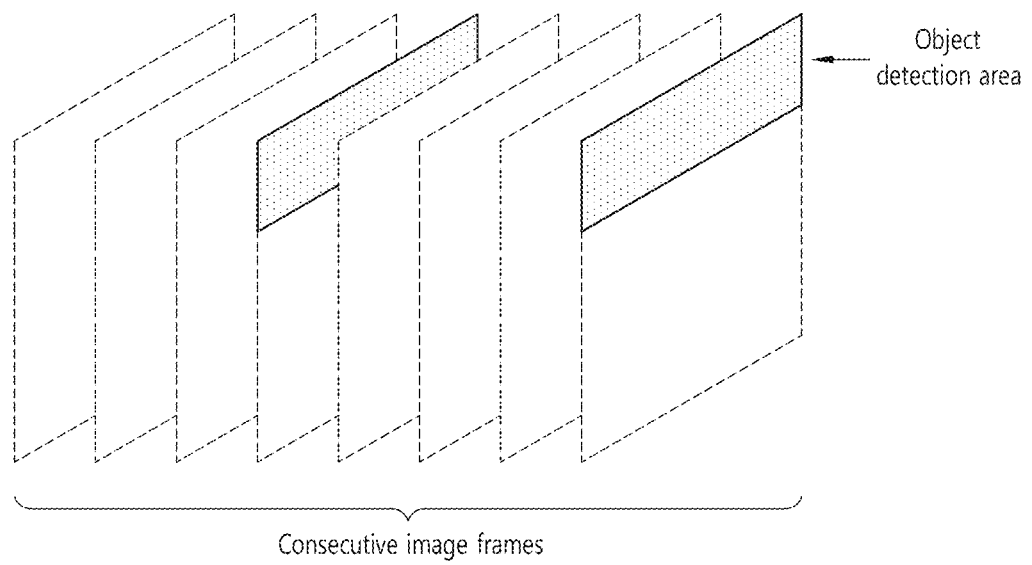
Figure 8C:
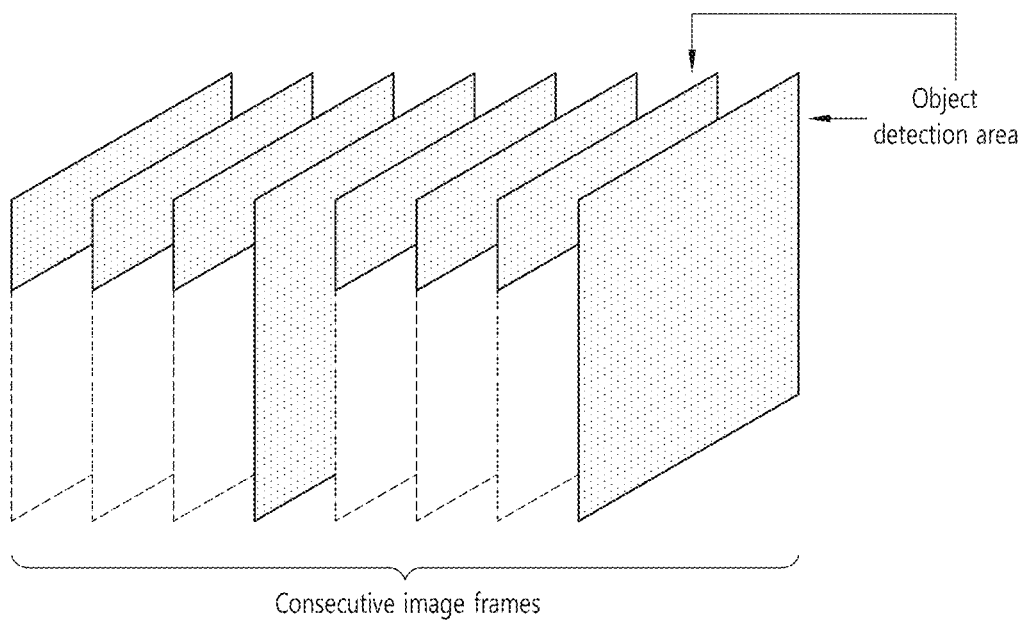

FIGS. 8A to 8C illustrate an application example of a method for limiting an object detection area in a mobile system according to one embodiment of the present disclosure.

A method for limiting an object detection area in a mobile system according to one embodiment of the present disclosure may be applied with a different frequency depending on rotation of the mobile system or position information of the mobile system.

As shown in FIG. 8A, object detection may be performed on a limited object detection area for each image frame and object tracking may be performed over the whole image. Or, as shown in FIG. 8B, for every N-th (in the example of FIG. 8B, N=4) image frame, object detection may be performed on a limited object detection area and object tracking is performed over the whole image frame, and for the remaining image frames, only object tracking may be performed. Or, as shown in FIG. 8C, for every N-th (in the example of FIG. 8C, N=4) image frame, object detection may be performed on the whole image, and for the remaining image frames, object detection may be performed on a limited image area, and object tracking may be performed on the whole image.

Here, object tracking is a computer vision technology searching for position changes of a specific object such as a human, an animal, or a vehicle in an image captured by a camera and tracks changes of an object by using similarity of characteristic information such as size, color, shape, or outline of the object within a series of image frames.

Figure 9:
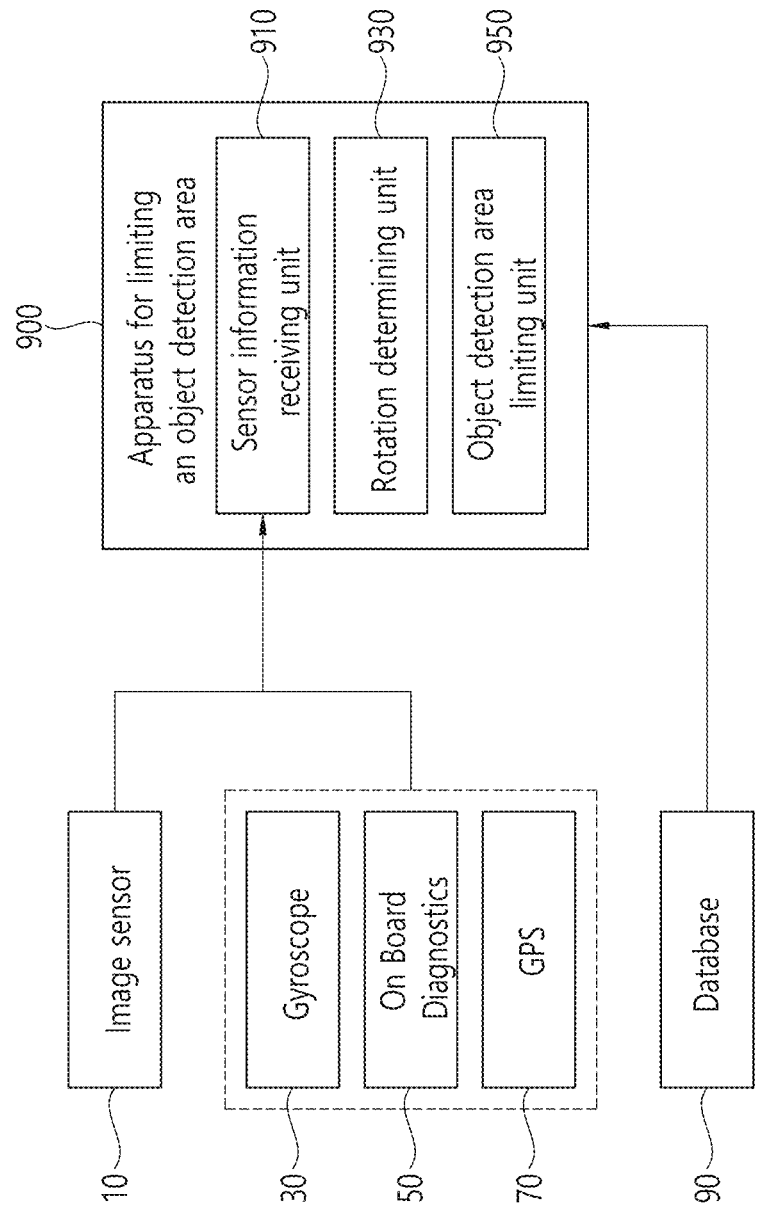
FIG. 9 is a block diagram of an apparatus for limiting an object detection area in a mobile system equipped with an image sensor according to another embodiment of the present disclosure.

FIG. 9 is a block diagram of an apparatus for limiting an object detection area in a mobile system equipped with an image sensor according to another embodiment of the present disclosure.

An apparatus for limiting an object detection area in a mobile system equipped with an image sensor according to another embodiment of the present disclosure includes a sensor information receiving unit 910, a rotation determining unit 930, and an object detection area limiting unit 950.

The sensor information receiving unit 910 receives an image from the image sensor. The sensor information receiving unit may further receive sensor information from a rotation detection sensor. Here, the rotation detection sensor includes at least one of gyroscope 30, On Board Diagnostics (OBD) 50, and GPS 70; and the sensor information may include at least one of 3-axis angular velocity, steering information, and position information.

The rotation determining unit 930 determines rotation of the mobile system by using at least one of the 3-axis angular velocity, steering information, and motion vector.

When the 3-axis angular velocity is used, the rotation determining unit 930 may determine rotation of the mobile system according to whether magnitude of one of the 3-axis angular velocities is equal to or larger than a first predetermined reference value. For example, given that the axes running from the left to the right, from the rear to the front, and from the bottom to the top of the mobile system are denoted by x, y, and z axis, respectively, if the largest of the angular velocities along the x, y, and z axis is equal to or larger than the first predetermined reference value, the rotation determining unit 930 may determine that the mobile system is rotating around the corresponding axis.

When the steering information is used, the rotation determining unit 930 may determine rotation of the mobile system according to whether a steering angle and a speed are equal to or larger than a second and third predetermined reference values, respectively.

When the motion vectors are used, the rotation determining unit 930 may determine rotation of the mobile system according to whether magnitude of the average of calculated motion vectors is equal to or larger than a fourth predetermined reference value.

The object detection area limiting unit 950 limits an object detection area to an area corresponding to a rotation direction of the mobile system within an image by using at least one of the 3-axis angular velocity, steering information, and motion vector. The object detection area limiting unit 950 may further limit the object detection area within an image by using position information.

When the 3-axis angular velocity is used, the object detection area limiting unit 950 may determine the rotation direction of a moving image by using the sign of the angular velocity and may limit the object detection area to an area corresponding to a rotation direction of the mobile system within an image.

When the steering information is used, the object detection area limiting unit 950 may determine the rotation direction of a moving image by using a steering angle and may limit the object detection area to an area corresponding to a rotation direction of the mobile system within an image.

When the motion vectors are used, the object detection area limiting unit 950 may determine the rotation direction of a moving image by comparing the respective components of the average of motion vectors and may limit the object detection area to an area corresponding to a rotation direction of the mobile system within an image.

When the position information is used, the object detection area limiting unit 950 may limit the object detection area according to road conditions around a current location obtained from a database 90 in which road information is recorded. Here, the database 90 may be implemented in the form of an external server of the apparatus for limiting an object detection area 900 or in the form of an internal memory of the apparatus for limiting an object detection area 900.

The object detection area limiting unit 950 may assign priorities in order of 3-axis angular velocity, steering information, and motion vector; and may select an object detection area by using sensor information with a higher priority.

The object detection area limiting unit 950 may combine the object detection area limited by using one of the 3-axis angular velocity, steering information, and motion vector; and the object detection area limited by using position information.

A method for limiting an object detection area in a mobile system equipped with an image sensor according to the present disclosure described above may be implemented in the form of code that may be read by a computer in a computer-readable recording medium. A computer-readable recording medium includes all kinds of recording media storing data that may be interpreted by a computer system. For example, the computer-readable recording medium may include Read Only Memory (ROM), Random Access Memory (RAM), a magnetic tape, a magnetic disk, a flash memory, and an optical data storage device. Also, the computer-readable recording medium may be distributed over computer systems connected to each other through a computer communication network so that computer-readable code may be stored and executed in a distributed manner.

In this document, the present disclosure has been described with reference to appended drawings and embodiments, but the technical scope of the present disclosure is not limited to the drawings or embodiments. Rather, it should be understood by those skilled in the art to which the present disclosure belongs that the present disclosure may be modified or changed in various ways without departing from the technical principles and scope of the present disclosure described in the appended claims below.

The present disclosure may provide the following effects. However, since it is not meant that a specific embodiment has to provide all of the following effects or only the effects, the technical scope of the present disclosure should not be regarded as being limited by the specific embodiment.

According to a method and an apparatus for limiting an object detection area in a mobile system equipped with an image sensor according to one embodiment of the present disclosure may receive an image from an image sensor, receive sensor information from a rotation detection sensor, determine rotation of the mobile system by using the image and the sensor information, and limit the object detection area to an area corresponding to a rotation direction.

Therefore, since the present disclosure does not cause unnecessary computations, the time required for object detection may be reduced, and object detection may be performed in real-time even in the mobile environment characterized by low computational performance

What is claimed is:

1. A method for confining an object detection area in a mobile system equipped with an image sensor, the method comprising:
   receiving an image obtained with respect to a detection target object from the image sensor;
   receiving sensor information of the mobile system, the sensor information including at least one of 3-axis angular velocity and steering information, and the steering information including a steering angle and a speed;
   determining a rotation direction of the mobile system by using the sensor information or by using the sensor information and motion vectors of the mobile system; and
   confining the object detection area to a region of the image based on the rotation direction of the mobile system.

2. The method of claim 1, wherein the determining of the rotation direction of the mobile system determines the rotation direction according to whether the steering angle and the speed are equal to or larger than a second predetermined reference value and a third predetermined reference value respectively.

3. The method of claim 1, wherein the motion vectors are calculated by using position changes of one or more objects within a sampled area of the image, and the determining of the rotation direction of the mobile system determines the rotation direction according to whether magnitude of an average of the motion vectors is equal to or larger than a fourth predetermined reference value.

4. The method of claim 1, wherein the receiving of the sensor information further receives position information from GPS.

5. The method of claim 4, wherein the object detection area is confined to the region of the image according to road conditions around a current location obtained from a database in which road information is recorded.

6. The method of claim 5, wherein the object detection area is confined to a third area combining a first area that is confined by using the at least one of the sensor information and the motion vectors and a second area that is confined according to road conditions around a current location obtained from the database in which road information is recorded.

7. The method of claim 1,
   wherein the determining of the rotation of the mobile system uses the 3-axis angular velocity when the sensor information is the 3-axis angular velocity, wherein the determining of the rotation of the mobile system uses the steering information when the sensor information is the steering information, and wherein the determining of the rotation of the mobile system by uses the 3 axis angular velocity when the sensor information includes both of the 3-axis angular velocity and the steering information.

8. The method of claim 1, further comprising detecting for an object only in the confined object detection area of the image.

9. The method of claim 1, wherein the determining of the rotation direction of the mobile system determines the rotation direction according to whether magnitude of one of the 3-axis angular velocities is equal to or larger than a first predetermined reference value.

10. A method for limiting an object detection area in a mobile system equipped with an image sensor, the method comprising:

receiving an image obtained with respect to a detection target object from the image sensor and receiving sensor information from a rotation detection sensor only when the mobile system is equipped with the rotation detection sensor, the sensor information including at least one of 3-axis angular velocity and steering information, and the steering information including a steering angle and a speed;

determining rotation of the mobile system by using at least one of the sensor information and motion vectors; and if it is determined that the mobile system is rotating, limiting an object detection area by using at least one of the sensor information and the motion vectors, wherein the determining rotation of the mobile system determines the rotation according to whether magnitude of one of the 3-axis angular velocities is equal to or larger than a first predetermined reference value.

11. An apparatus for confining an object detection area in a mobile system equipped with an image sensor, the apparatus comprising:

a sensor information receiving unit receiving an image obtained with respect to a detection target object from the image sensor;

receiving sensor information of the mobile system, the sensor information including at least one of 3-axis angular velocity and steering information, and the steering information including a steering angle and a speed;

a rotation determining unit determining a rotation direction of the mobile system by using the sensor information or by using the sensor information and motion vectors of the mobile system; and an object detection area limiting unit confining the object detection area to a region of the image based on the rotation direction of the mobile system.

12. The apparatus of claim 11, wherein the rotation determining unit determines the rotation direction according to whether magnitude of one of the 3-axis angular velocities is equal to or larger than a first predetermined reference value.

13. The apparatus of claim 11, wherein the rotation determining unit determines the rotation direction according to whether the steering angle and the speed are equal to or larger than a second predetermined reference value and a third predetermined reference value respectively.

14. The apparatus of claim 11, wherein the motion vectors are calculated by using position changes of one or more objects within a sampled area of the image, and the rotation determining unit determines the rotation direction according to whether magnitude of an average of the motion vectors is equal to or larger than a fourth predetermined reference value.

15. The apparatus of claim 11, wherein the sensor information receiving unit further receives position information from GPS.

16. The apparatus of claim 15, wherein the object detection area is confined to the region of the image according to road conditions around a current location obtained from a database in which road information is recorded.

17. The apparatus of claim 16, wherein the object detection area is confined to a third area combining a first area that is confined by using the sensor information and a second area that is confined according to road conditions around a current location obtained from the database in which road information is recorded.

18. The apparatus of claim 11, wherein the rotation determining unit, determines the rotation direction of the mobile system using the 3-axis angular velocity when the sensor information is the 3-axis angular velocity, or determines the rotation direction of the mobile system using the steering information when the sensor information is the steering information, or determines the rotation direction of the mobile system by using the 3-axis angular velocity when the sensor information includes both the 3-axis angular velocity and the steering information.

\* \* \* \* \*